(12) United States Patent
Nara

(10) Patent No.: US 9,784,311 B2
(45) Date of Patent: Oct. 10, 2017

(54) FINITE LINEAR MOTION GUIDE UNIT

(71) Applicant: NIPPON THOMPSON CO., LTD., Tokyo (JP)

(72) Inventor: Tsuguyoshi Nara, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/096,499

(22) Filed: Apr. 12, 2016

(65) Prior Publication Data

US 2016/0319865 A1 Nov. 3, 2016

(30) Foreign Application Priority Data

Apr. 30, 2015 (JP) ................. 2015-092770

(51) Int. Cl.
| | |
|---|---|
| *F16C 29/04* | (2006.01) |
| *F16H 21/00* | (2006.01) |
| *F16C 33/30* | (2006.01) |
| *F16C 33/46* | (2006.01) |
| *F16C 33/58* | (2006.01) |

(52) U.S. Cl.
CPC .......... *F16C 29/041* (2013.01); *F16C 29/043* (2013.01); *F16C 33/306* (2013.01); *F16C 33/4605* (2013.01); *F16C 33/4635* (2013.01); *F16C 33/585* (2013.01); *F16C 2208/20* (2013.01); *F16C 2300/28* (2013.01)

(58) Field of Classification Search
CPC .. F16C 29/043; F16C 33/306; F16C 33/4605; F16C 33/4635; F16C 33/543

USPC .......... 384/47, 49, 51, 56–57, 59, 50; 74/29, 74/109–110, 440, 422, 431, 457
See application file for complete search history.

(56) References Cited

U.S. PATENT DOCUMENTS

| | | | | |
|---|---|---|---|---|
| 3,975,063 A | * | 8/1976 | Mahotka | ............... A47B 88/493 |
| | | | | 384/18 |
| 5,076,715 A | * | 12/1991 | Saoyama | ............. A47B 88/487 |
| | | | | 384/18 |
| 5,427,454 A | * | 6/1995 | Tsuboi | .................. F16C 29/041 |
| | | | | 384/47 |
| 6,276,830 B1 | * | 8/2001 | Edelmann | ............. F16C 29/041 |
| | | | | 384/47 |

(Continued)

FOREIGN PATENT DOCUMENTS

| | | | | |
|---|---|---|---|---|
| EP | | 1431601 A2 * | 6/2004 | ............ F16C 29/041 |
| JP | | 11108056 A | 4/1999 | |

(Continued)

*Primary Examiner* — Marcus Charles
(74) *Attorney, Agent, or Firm* — Browdy and Neimark, PLLC

(57) ABSTRACT

A small-sized finite linear motion guide unit is provided in which there is provided a rack-and-pinion arrangement to prevent any discrepancy between retainer plates to make sure of relative sliding movement of guideways. A rack is composed of teeth portions and a pair of connecting bars to fasten the teeth thereon. The connecting bars are different in widthwise length to form asymmetrical shapes. The grooves for a rack made on the guideway includes a middle groove to get the rack to mate with the pinion, and sidewise grooves lying on both sides of the middle groove and having the connecting bars different in widthwise length to make an asymmetric shape.

10 Claims, 10 Drawing Sheets

(56) References Cited

U.S. PATENT DOCUMENTS

| | | | | |
|---|---|---|---|---|
| 6,886,983 B2* | 5/2005 | Tsuboi | ............... | F16C 29/041 384/47 |
| 6,971,797 B2* | 12/2005 | Obara | ............... | F16C 29/041 384/47 |
| 7,210,849 B2* | 5/2007 | Yamazaki | ............ | F16C 29/041 384/47 |
| 8,142,079 B2* | 3/2012 | Kakei | ............... | F16C 29/041 384/51 |
| 8,206,038 B2* | 6/2012 | Kanoh | ............... | F16C 29/041 384/47 |
| 8,360,644 B2* | 1/2013 | Kanoh | ............... | F16C 33/541 384/47 |
| 8,573,847 B2* | 11/2013 | Lee | ............. | F16C 29/041 384/47 |
| 2002/0114546 A1* | 8/2002 | Vegh | ................ | F16C 29/041 384/51 |
| 2003/0108256 A1* | 6/2003 | Kamimura | ............ | F16C 29/041 384/51 |
| 2012/0243811 A1* | 9/2012 | Kano | ................ | F16C 33/4605 384/51 |

FOREIGN PATENT DOCUMENTS

| | | | | | |
|---|---|---|---|---|---|
| JP | 2003176820 A | | 6/2003 | | |
| JP | 2004197850 A | * | 7/2004 | ............ | F16C 29/041 |
| JP | 2007232061 A | * | 9/2007 | ............ | F16C 29/041 |
| JP | 2007232062 A | | 9/2007 | | |
| JP | 2010236604 A | * | 10/2010 | ............ | F16C 29/041 |
| JP | 20120458 A | | 10/2012 | | |

* cited by examiner

& # x20;# FINITE LINEAR MOTION GUIDE UNIT

FIELD OF THE INVENTION

The present invention relates generally to a linear motion guide unit of the type hereinafter referred to as "finite linear motion guide units" because of their construction where a pair of lengthwise guideway members lies movable relatively to one another by virtue of more than one rolling element of cylindrical roller lying between the guideway members in such geometry that their own axes intersect alternately in perpendicular to one another to move the lengthwise guideway members relatively to each other over a predetermined distance.

BACKGROUND OF THE INVENTION

Current finite linear motion guide units of the sort recited just above have been used extensively in relatively sliding parts in diverse fields of machinery such as semiconductor manufacturing machines, various assembling machines, and all sorts of robots. The electronic machines with the promotion of miniaturization and high performance thereof are needed increasingly to be compact, highly functional and applicable to high-speed acceleration/deceleration under high load capacity. Especially, small-sized finite linear motion guide units are needed to be applicable to high-speed acceleration/deceleration even under small-sized and high-loaded capacity and further to be easier for assembly.

In co-pending Japanese Laid-Open No 2012-202, 458, there is disclosed a finite linear motion guide unit in which the holder plate to keep the rollers between the lengthwise guideway members is made less in warp or bending in lengthwise direction and means to keep the rollers are made at the windows in the holder plate to make less the pitch between any adjacent rollers to increase the number of roller lying in a predetermined length. With the finite linear motion guide unit constructed as stated just earlier, the holder plate is made of synthetic resin and integral with a holder part to have a pinion wheel. The holder plate has more than one window to keep the rollers in the holder plate in a fashion tilting 45 degrees with respect to the side or plane of the holder plate and also any two adjoining rollers intersecting with one another. The edge defining the window has grasping parts to make engagement with the circular edges of the roller. The holder plate has flanges extending out of any side of the holder plate so as to make less the warp or bending of the holder plate.

In another co-pending Japanese Laid-Open No. 2007-232, 062, there is disclosed a finite linear motion guide unit in which a mechanism to prevent any discrepancy is constituted with a pinion held in a retainer and a rack lying on the guideway member. The pinion is has a configuration rich in rigidity or stiffness. The mechanism to prevent any discrepancy constructed as stated earlier has a holder held on the pinion holder, a rack placed in a relief valley between a pair of the guideway member, and a pinion wheel provided with teeth mating with the rack and mounted for rotation on the holder. The pinion wheel has a circular plate, teeth made on the circular plate in a geometry spaced away uniformly circumferentially to mate with the rack, and a journal shaft to support for rotation the pinion wheel on the holder. The tooth has the tooth shape having a flat tooth top and tooth sides extending in parallel with each other to provide a rectangular tooth configuration having a uniform tooth thickness.

In a further another co-pending Japanese Laid-Open No. H11-108,056 (refer to literature 1 hereinafter), there is disclosed a finite linear guideway in which the teeth on the rack have recesses to prevent any interference of the teeth with the rollers while running along the track raceway. The finite linear guideway recited just above has a pair of raceway members, more than one cylindrical rolling elements lying between raceway grooves in the raceway members, a retainer plate to keep the cylindrical rollers lying between the raceway members, a rack laid in a relief groove made in the raceway groove, and a pinion wheel mating with the rack and mounted for rotation on the retainer plate. The rack has recesses each of which is made between any two adjacent teeth. Upon relative movement of the paired raceway member, even if the rolling elements roll through the raceway lying between the raceway grooves to make relative movement together with the retainer plate, the foremost ends of the cylindrical rollers only pass through the recesses of the teeth of the rack with no interference with the teeth of the rack. Moreover, with the limited linear motion guide unit having the limited linear motion guideway constructed as stated earlier, there is simply made the limited linear motion guide having a fear of causing any discrepancy.

In a further another co-pending Japanese Laid-Open No. 2003-176,820, there is disclosed a finite linear guide unit in which a rack-and-pinion arrangement is interposed between paired guide rail members to keep a retainer against falling off from the guide rail to make it possible to use the guide unit having the relief groove less in depth. This construction makes it easier to use the rack less in depth. With the finite linear guide unit constructed as stated earlier, the rack is constituted with toothed parts provided spaced away at preselected intervals, and side walls extending lengthwise continuously on both sides of the toothed parts to connect at least adjacent toothed parts with each other. The side walls of the rack are made large in thickness to broaden toward the end so as to make engagement with dovetailed wall surfaces of the relief groove inside the raceway groove of the guideway member to hold the rack inside the relief groove of the guide unit.

Subject to be Solved with this Invention

With the linear motion guide unit disclosed in the literature 1, there is provided a rack-and-pinion mechanism to prevent any discrepancy of the retainer. In the rack-and-pinion mechanism recited above, the retainer of synthetic resins is made integral with the holder to keep therein the pinion. The retainer has flanges on opposite sides thereof to keep the retainer against warping thereof. With the linear motion guide unit constructed as described earlier, the raceway grooves in the guideway members have deeper grooves to fit over the racks. Upon insertion of the rack in the deeper grooves, there is a fear that the rack is easier to be assembled wrongly in the raceway grooves in the guideway members.

SUMMARY OF THE INVENTION

The present invention has for its object to solve the problems as stated earlier. The linear motion guide unit disclosed herein is miniaturized type in which the guideway member has the height of 4 mm and the width of 3.9 mm. The linear motion guide unit of the present invention has a rack-and-pinion mechanism to prevent any discrepancy of the retainer so as to adapt for the operating velocity and acceleration/deceleration. Moreover, the holder to keep the pinion on the holder plate is made integrally. Thus, though the rack-and-pinion mechanism is miniaturized, the retainer may be made simple in construction and further the assembly between the raceway members is made easier. Moreover, the retainer plate of synthetic resin moldings is suited for acceleration/deceleration movement under highly loaded condition. The integral construction of the holder to fit the pinion to retainer plate is in favor of less number of parts and components, thereby advantageous for simpler and compact in construction and inexpensive in production costs.

Means to Solve the Problems

The present invention is concerned with a limited linear motion guide unit; comprising a pair of guideway members lying movable relatively to one another and having lengthwise V-shaped relief grooves in transverse section thereof, a retainer having a retainer plate arranged between guideway members to extend in a lengthwise direction of the guideway members, the retainer having a lengthwise retainer plate to retain more than one rolling element of roller at a preselected interval, and a discrepancy-prevention mechanism to keep the retainer against discrepancy which would cause between the guideway members, and the discrepancy-prevention mechanism consisting of racks mounted on the guideway members and a pinion wheel supported for rotation in a hole made in the retainer plate, wherein the rack is composed of teeth mating with the pinion wheel and a pair of connecting bars to fasten together opposite ends of the teeth to keep a predetermined interval between the connecting bars, and the connecting bars being made different each other in widthwise dimension to have an asymmetrical shape, wherein a valley made for the rack in the guideway members has bottom surface having a predetermined width to keep the rack therein, wherein the pinion wheel has a middle groove opened at one end thereof to allow the pinion wheel to mate with the teeth of the rack, and a pair of grooves extending sidewise from both side of the middle groove to provide the connecting bars, wherein the sidewise grooves extend lengthwise with asymmetry in widthwise distance to fit over the connecting bars of the asymmetric rack, and wherein the asymmetry of the connecting bars in the rack means that the connecting bars are different from each other in height length, widthwise length, and/or shape in transverse section, and further the asymmetry of the sidewise grooves means that the sidewise grooves are formed complementarily in corresponding to the asymmetry of the connecting bars.

In an aspect of the present invention, a limited linear motion guide unit is disclosed in which the connecting bars of the rack is formed at the ends thereof in different inclined or slant surfaces in transverse section, and the sidewise groove of the rack groove has a different inclined or slant surface of circular shape in cross-section in correspondence to a shape of the connecting bar. Alternately, the connecting bar of the rack has the ends of circular surface in transverse section and the sidewise groove of the rack groove has an end surface of circular shape in cross-section in correspondence to a shape of the connecting bar. In another aspect of the present invention, the sidewise groove of the rack groove has one end thereof made in an inclined surface and at another end thereof made in a circular surface.

With the linear motion guide unit of the present invention, moreover, the teeth of the rack each have at their tooth tops V-shaped grooves to relieve corners between end surface and rolling surface of the roller.

With the linear motion guide unit of the present invention, moreover, the retainer plate has flat surfaces extending in parallel with each other and in adjacency with the wall surfaces of the guideway members and further the retainer plate is made of synthetic resin molding having more than one window in which the roller is held for rotation in such a geometry that an axial center of the roller is in perpendicular to the lengthwise direction of the guideway members and further tilted 45 degrees relative to the flat surface of the retainer plate, the retainer plate has the bearing hole made in a cross-shape consisting of a vertical slot extending in widthwise direction to accommodate therein a shaft of the pinion wheel for rotation and a horizontal slot which extends lengthwise to accommodate therein teeth of the pinion wheel, and wherein a holder to guide rotation of the pinion is provided in such a manner extending from the flat surfaces in a direction of rotation of the pinion wheel on widthwise both edges of the pinion slot.

Moreover, the holders formed at widthwise both edges of the pinion slot have raised portions at both sides of the vertical slot in a bearing hole, and the raised portions hold the pinion in such a manner surrounding the shaft of the pinion wheel. In addition, the raised portions formed on the holder are made to extend from inside shaft insertion at four corners lying at crossing part between the vertical slot in a bearing hole and the pinion slot to form a triangular shape.

The rack, pinion wheel and the retainer plate are made of thermoplastic resin of crystalline polyacetal.

The guideway member has the height of 4 mm and the width of 3.9 mm. In spite of the limited linear motion guide unit made in an ultra-miniature construction, the rack-and-pinion mechanism is allowed to fit in the limited linear motion guide unit to protect the retainer against discrepancy thereof.

Effect of the Invention

With the limited linear motion guide unit of the present invention, since the shape of the rack and the groove for the rack on the guideway member are made asymmetrical each other, there is no fear of causing accidental error at the phase of arrangement of the rack into the groove for the rack made in the guideway member. Thus, the rack is allowed to fit easily and smoothly in the groove for rack made in the guideway member. Even if the guide unit is very small in size, there is no fear of causing any trouble of miss-assembly for the rack with reliability. With the limited linear motion guide unit constructed as stated earlier, as the direction to assemble the rack into the groove 16 for the rack in the guideway member is limited to only one direction, there is no fear of failure in assembly of the rack into the groove for the rack in the guideway member. With the linear motion guide unit of the present invention, irrespective of the linear motion guide unit of miniature construction whose guideway member has the height of 4 mm and the width of 3.9 mm, the retainer installed between the guideway members has the discrepancy-prevention mechanism of rack-and-pinion arrangement. Thus, the linear motion guide unit of the present invention may be designed to meet with the high speed, high acceleration/deceleration operation. In addition, the holder plate is made integral with the holder part to have a pinion wheel. Thus, irrespective of the rack-and-pinion arrangement of small construction, the retainer is allowed to be simplified in construction and assembled with easier between the guideway members. Moreover, as the raised portions of the holder is formed in a small triangular shape, the pinion wheel is less in resistance which will be encountered when assembled into the pinion slot 33, so that the pinion wheel may be assembled easily into the retainer plate. Moreover, the rack, pinion and the retainer plate, since made of a molding of thermoplastic resin of crystalline polyacetal, are applicable to the highly loaded conditions and high acceleration/deceleration movement. With the limited linear motion guide unit constructed as stated earlier, the pinion holder integral with the retainer plate is less in number of parts and components and therefore made in more simple construction with less costs.

DETAILED DESCRIPTION OF THE INVENTION

Figure 1:
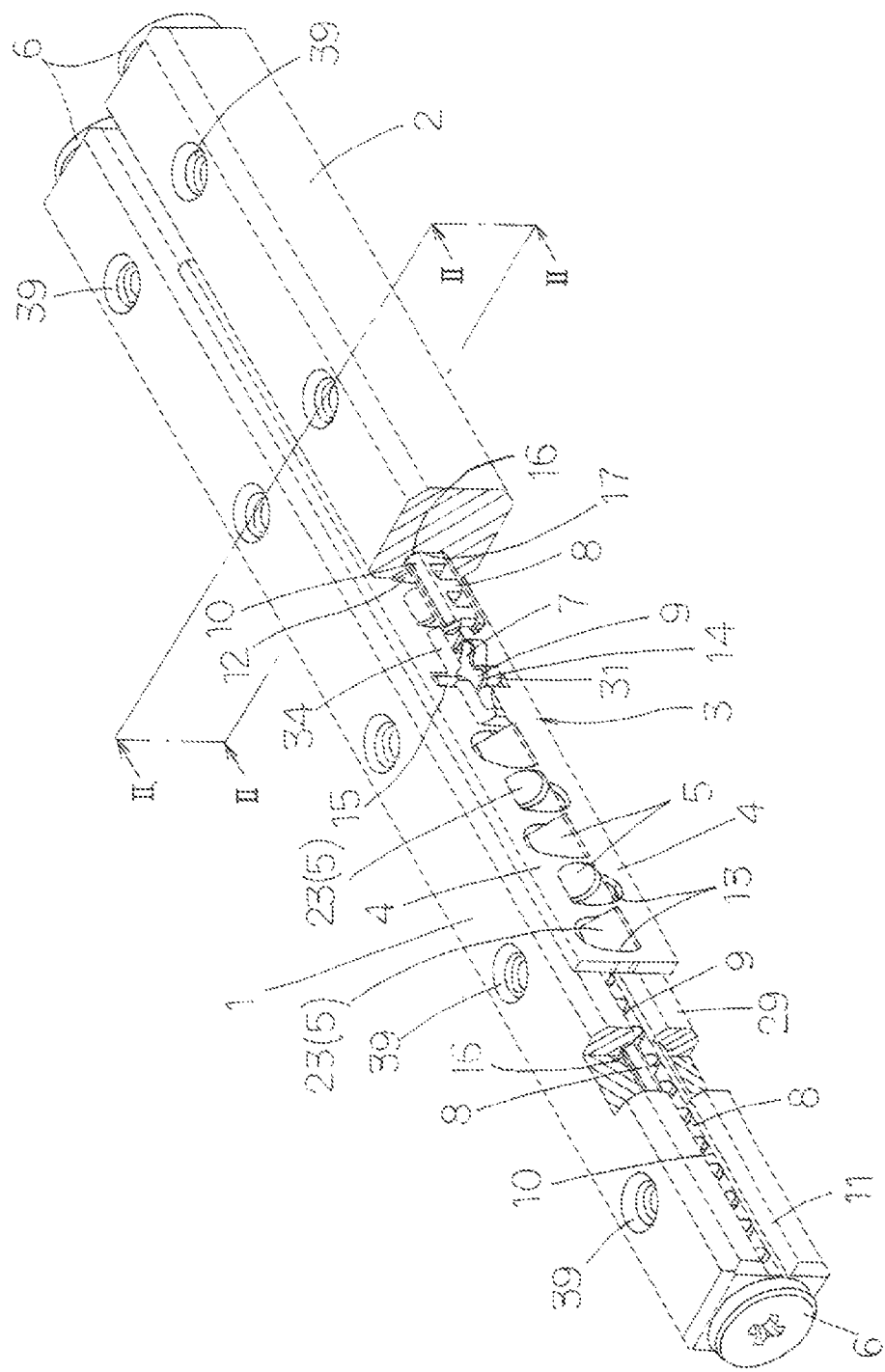
FIG. 1 is a perspective view in appearance showing a preferred embodiment of a finite linear motion guide unit according to the present invention.

The finite linear motion guide unit discussed later is adapted for use in a variety of machinery including semiconductor manufacturing machines, machine tools, a variety of assembly machines, industrial robots, and so on.

The finite linear motion guide unit of the present invention will be described in detail with reference to the accompanying drawings.

The finite linear motion guide unit of the present invention includes a pair of elongated guideway members 1 and 2 allowed to move relatively each other, more than one roller 5 of rolling element lying between the guideway members 1 and 2, a retainer 3 of a retainer plate 4 extending lengthwise to hold the rollers 5 at predetermined intervals, and a rack-and-pinion mechanism 9 to prevent any discrepancy of the retainer 3. The rack-and-pinion mechanism 9 is composed of a rack 8 and a pinion 7 supported for rotation in a bearing hole 31 made in the retainer plate 4. The guideway members 1 and 2 are disposed in a way their wall surfaces 29 are spaced from each other across a predetermined interval between them. The retainer 3 has a retainer plate 4 made with windows 13 to keep the rollers 5 spaced away from each other at a predetermined interval. The guideway members 1 and 2 have lengthwise side walls 29 lying in opposition to each other. The opposed side walls 29 each have a relief groove 10 in which raceway surfaces 11, 12 are made to oppose each other in a V-shape arrangement. The rack 8 is arranged in a valley 16 between the raceway surfaces 11, 12. With the finite linear motion guide unit constructed as stated earlier, there is provided a discrepancy-prevention mechanism of rack-and-pinion mechanism in which any discrepancy of the retainer 3 out of a predetermined relative position of the retainer 3 may be corrected. With the finite linear motion guide unit of the present invention, the elongated guideway members 1 and 2 have a rectangular shape in their transverse sections and opposed wall surfaces 29 of lengthwise raceway surfaces 11, 12 of V-shape in cross-section. A deep bottom lying between raceway surfaces 11, 12 of the relief groove 10 in the guideway members 1 and 2 has a lengthwise valley 16 in which a rack 8 is fastened to the guideway members 1 and 2 by means of end screws 6 secured to opposite ends of the guideway members 1 and 2. The opposite ends of the guideway members 1 and 2 have the threaded holes 46 and the knocked holes 40. The knocked holes 40 are made at the ends of the guideway members 1 and 2 as marks to identify the mounting reference surface upon processing the guideway members 1 and 2. The rack 8 after placed to the guideway members 1 and 2 is fastened to the guideway members 1 and 2 by means of the end screws 6 driven into threaded holes 46.

With the finite linear motion guide unit of the present invention, the roller 5 is a cylinder having the length somewhat smaller than the diameter or substantially 1:1. The rollers 5 are arranged lengthwise in a raceway passage defined between the raceway surfaces 11, 12 of the paired guideway members 1 and 2 in such geometry that their own axes intersect alternately in perpendicular to one another to form the finite linear motion guide unit of cross-roller type. The roller 5 tilted in one direction has a circular rolling surface 23 making rolling contact with any one of opposite raceway surfaces 11, 12, and circular end surfaces 24 making sliding contact with opposite raceway surfaces 11, 12. The roller 5 tilted in another direction crossing with the one direction has a circular rolling surface 23 making rolling contact with another of the opposite raceway surfaces 11, 12, and circular end surfaces 24 making sliding contact with another of opposite raceway surfaces 11, 12. Thus, the rolling surface 23 of the roller 5 lying between the guideway members 1 and 2 are allowed to roll through between the opposite raceway surfaces 11 and between the opposite raceway surfaces 12. The roller 5 has an axial center which is perpendicular to the lengthwise direction of the raceway surfaces 11, 12 and further tilted 45 degrees with respect to the wall surface 29 of the guideway members 1 and 2. Moreover, the retainer 3 is composed of the flat retainer plate 4 lying between the opposite wall surfaces 29 of the paired guideway members 1 and 2, the pinion 7 supported for rotation in a holder portion 34 molded integrally with a middle portion of the retainer plate 4, and more than one roller 5 of rolling elements laid midway widthwise of the retainer plate 4 and spaced away from each other at a predetermined interval in the lengthwise direction of the retainer plate 4. The guideway members 1 and 2 have fastening holes 39 made at predetermined intervals on the walls which cross perpendicularly with the wall surface 29 of the paired raceway surfaces 11, 12 having the relief groove 10. The surfaces having the threaded holes 39 of the guideway members 1 and 2 have the mounting surfaces to fasten other members, instruments, bases and so thereto.

With the finite linear motion guide unit of the present invention, moreover, the retainer plate 4 is interposed between the opposite wall surfaces 29 of the guideway members 1 and 2 in such a relation that the parallel flat surfaces 30 come into closely adjacent to the wall surface 29 of the paired raceway surfaces 11, 12. The retainer plate 4 has the width kept less than the width of the guideway members 1 and 2 so as not to extend over the width of the guideway members 1 and 2. The retainer plate 4 has a window 13 in which the roller 5 is held for rotation in such a geometry that the axial center of the roller 5 is in perpendicular to the lengthwise direction of the guideway members 1 and further tilted 45 degrees relative to the flat surface 30 of the retainer plate 4. The window 13 has a substantially elliptic shape having a shorter diameter and a longer diameter so as to conform to the rolling surface 23 of the tilted roller 5. On the longer axis of the elliptic window 13, there are made open recesses 45 at window edges opposed to accommodate the roller 5 therein. The open recess 45 has a grasping portion 43 to cover the circular end surface 24 of the roller 5. A pair of opposed grasping portions 43 supports for rotation the end surfaces of the roller 5. The grasping portion 43 has an inside surface opposed to the end surface of the roller 5 to provide a beveled support surface 44 extending along the end surface 24 of the roller 5, and an outside surface flush with the flat surfaces 30.

The grasping portions 43 formed on the retainer plate 4 are at the opposite ends of the longer axis of the elliptic window 13 to arrange the adjacent rollers 5 to get them cross perpendicularly each other. With the window 13 made in the retainer plate 4, thus, one of the grasping portions 43 is made on one of flat surfaces 30 and another of the grasping portions 43 is made on another of flat surfaces 30. With the adjacent windows 13, one of the grasping portions 43 is made on another flat surface 30 and another of the grasping portions 43 is made on one flat surface 30. Thus, the grasping portions 43 are made alternately on different flat surfaces. The roller 5 at the grasping portions 43 of the windows 13 in the retainer plate 4 is born against the grasping portions 43 with circular end surface 24 of the roller 5 making abutment against the beveled support surface 44. The roller 5 is held inside the window 13 after the rolling surface 23 of the roller 5 adjacent to the end surface 24 of the roller 5 has been caught with the edge of the window 13. The window 13 is made less in window width at an area corresponding to rolling surface 23 of the roller 5 adjacent to the end surface 24 of the roller 5. Thus, the rolling surface 23 of the roller 5 is held at the edge of the window 13.

With the retainer plate 4, a pair of flat surfaces 30 extends on both sides of the window 13 and the edge around the grasping portion 43 has a thickness of half the thickness t across the opposed surfaces 30, or 0.5×t. The residual half thickness around the window 13 is made in a recession 45. The recession 45 is used for a space to insert the mold for the grasping portion 43 vertically relative to the opposed surfaces 30 from the surface 30 opposite to the surface 30 having the grasping portion 43. The retainer plate 4 having recession 45 may be easily attached and/or detached from any simple mold. Thus, the molding of synthetic resins may be simply formed. The linear motion guide unit of the present invention has the construction that the rolling elements 5 are allowed to fit in the windows 13 in the retainer plate 4 of synthetic resin-made molding.

Figure 4:
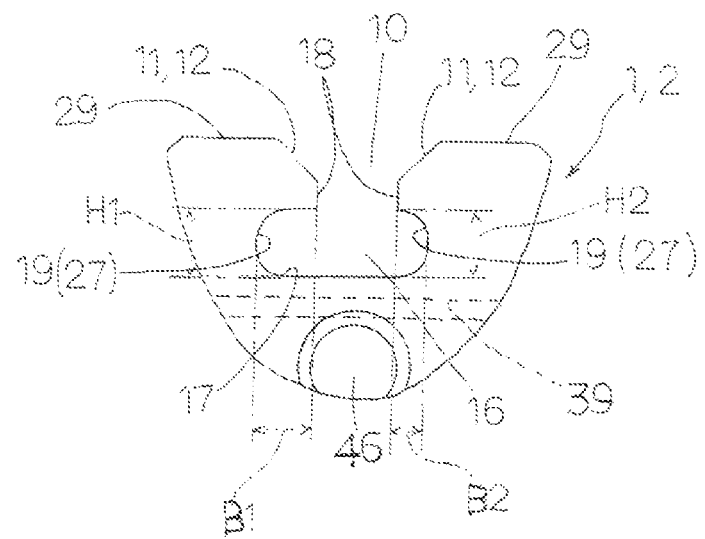
FIG. 4 is an enlarged section view showing an area of signed IV in FIG. 3.
Figure 5:
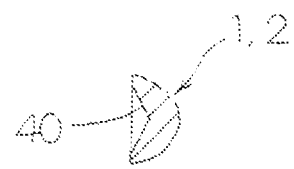
FIG. 5 is a sectional view showing knocked hole for discrimination made at an end of the finite linear motion guide unit of FIG. 3.
Figure 6:
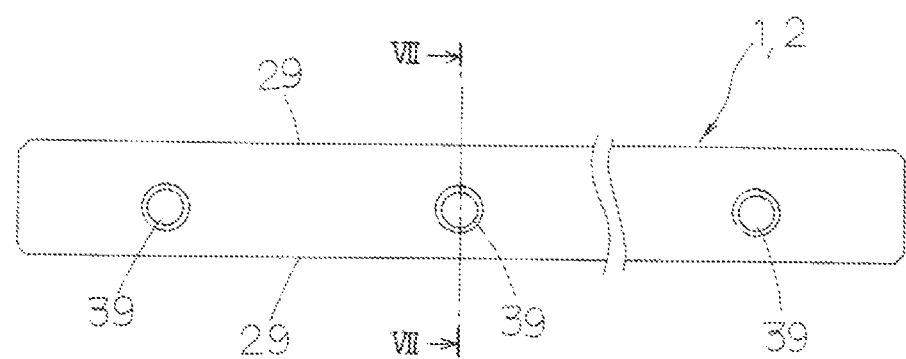
FIG. 6 is a front view showing a mounting surface of the guideway member in the finite linear motion guide unit of FIG. 1.
Figure 7:
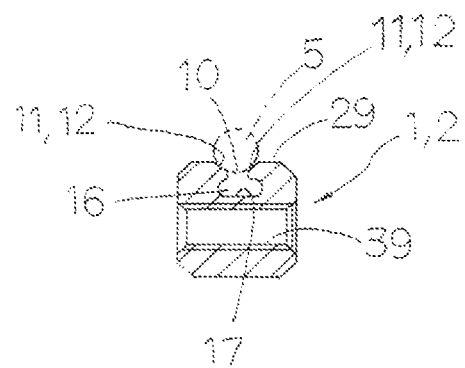
FIG. 7 is a traverse section of the guideway member, taken along the plane lying on the line VII-VII of FIG. 6.
Figure 8:
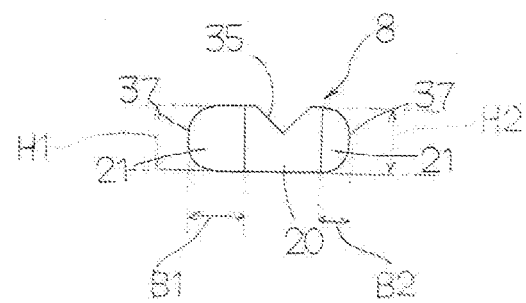
FIG. 8 is an end view showing a rack to be assembled in the guideway member in the finite linear motion guide unit of FIG. 1.
Figure 9:
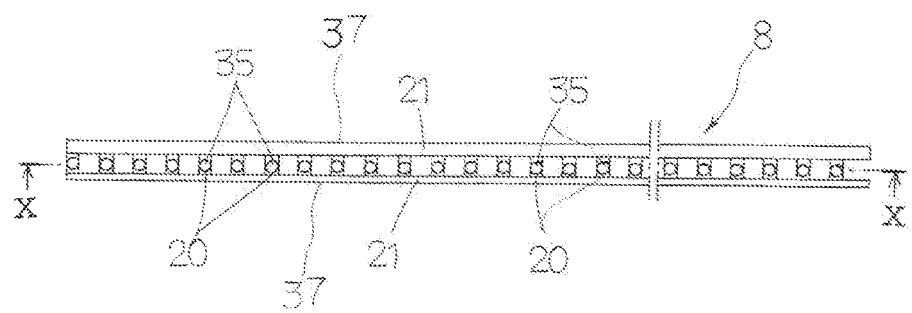
FIG. 9 is a plan view showing a rack of FIG. 8.
Figure 10:
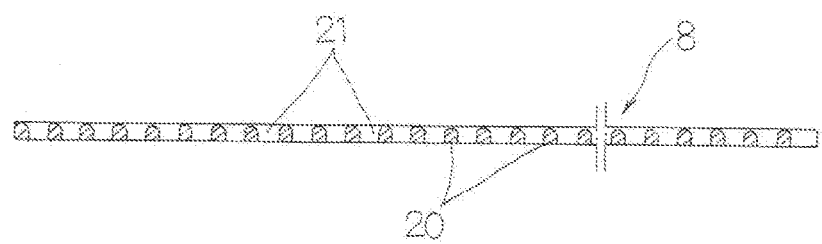
FIG. 10 is a lengthwise sectional view of the rack, taken along the plane lying on the line X-X of FIG. 9.

With linear motion guide unit of the present invention, especially the rack 8 is composed of teeth 20 mating with the pinion 7 and a pair of connecting bars 21 to fasten together opposite ends 22 of the teeth 20 to keep a predetermined interval between the connecting bars 21. The connecting bars 21 are made different each other in widthwise dimension to have an asymmetrical shape. The valley 16 made for the rack 8 in the guideway members 1 and 2 has bottom surface 17 having a predetermined width to keep the rack 8 therein, a middle groove 18 opened at one end thereof to allow the pinion 7 to mate with the teeth 20 of the rack 8, and a pair of grooves 19 extending sidewise from both side of the middle groove 18. The valley 16 in the guideway members 1 and 2 is made to extend lengthwise with asymmetry in widthwise distance to fit over the connecting bars 21 of the asymmetric rack 8 different in widthwise lengths. It will be thus understood that the asymmetry of the connecting bars 21 in the rack 8 means that the connecting bars 21 are different from each other in height length, widthwise length, and/or shape in transverse section. Moreover, the asymmetric shape to define the grooves 19 in the guideway members 1 and 2 is formed in a configuration complementary to the configuration of the connecting bars 21 in the rack 8. Thus, the connecting bars 21 are different from each other in height length, widthwise length, and/or shape in transverse section in such a manner that the grooves 19 lying on both sides are different from each other in height length, widthwise length, and/or shape in transverse section. It will be thus understood that valley or groove 16 for the rack 8 has a transverse section which, especially as shown in FIG. 4, is asymmetric shape with respect to the middle line P-P of the middle groove 18. Moreover, signs B1 and B2 show sidewise lengths of the grooves 19 extending sidewise from both side of the middle groove 18. Signs H1 and H2 are the height lengths equivalent to the depths of the sidewise grooves 19. The rack 8 has a transverse section which is, as shown in FIG. 8, made asymmetry with respect to the middle line R-R of the tooth 20. The connecting bars 21 of the rack 8 each have a shape complementary to the sidewise grooves 19 to fit into the sidewise grooves 19. Thus, the widthwise lengths extended from the tooth 20 are shown by signs B1 and B2 in corresponding to the sidewise grooves 19 and the heights of the tooth 20 are the thickness of the connecting bars 21 and shown by signs H1 and H2 in matching with the sidewise grooves 19.

Figure 2:
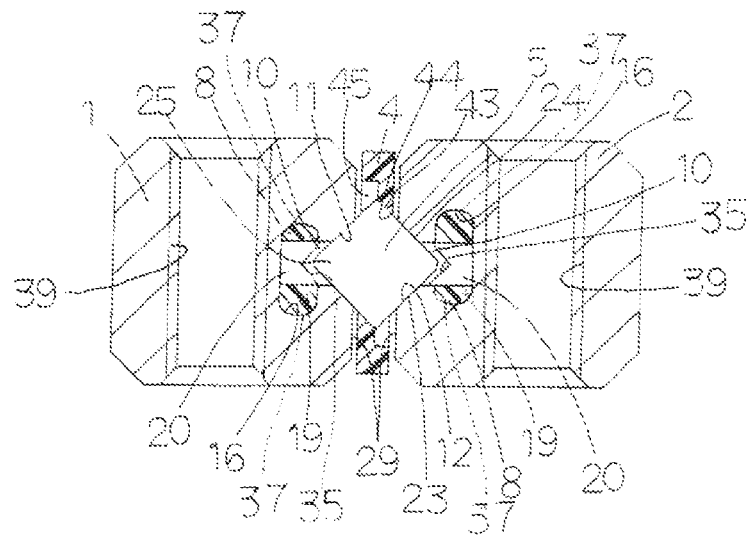
FIG. 2 is a traverse section of a first version of the finite linear motion guide unit of FIG. 1, taken along the plane lying on the line II-II of FIG. 1.
Figure 3:
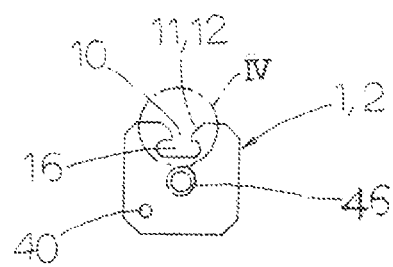
FIG. 3 is an end elevation showing a guideway member in the finite linear motion guide unit of FIG. 1.
Figure 20:
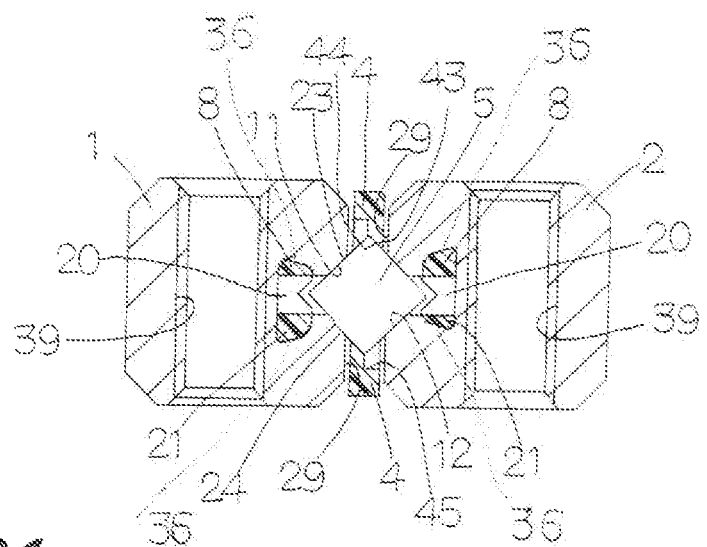
FIG. 20 is a sectional view showing a second version of the finite linear motion guide unit of FIG. 1, taken along the plane lying on the line II-II of FIG. 1.
Figure 21:
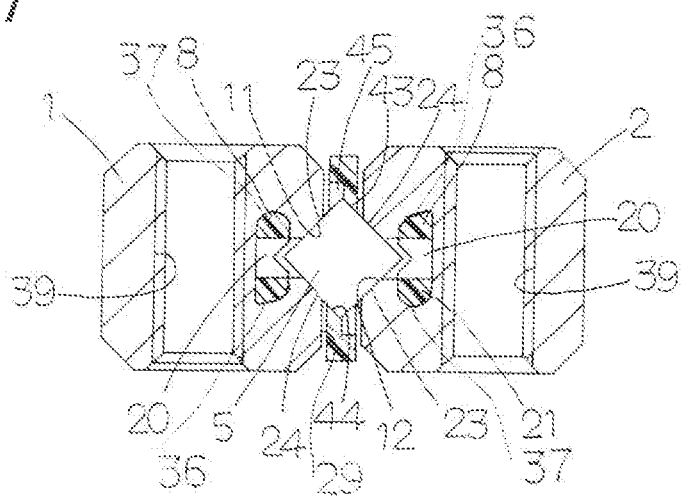
FIG. 21 is a sectional view showing a third version of the finite linear motion guide unit of FIG. 1, taken along the plane lying on the line II-II of FIG. 1.
Figure 22:
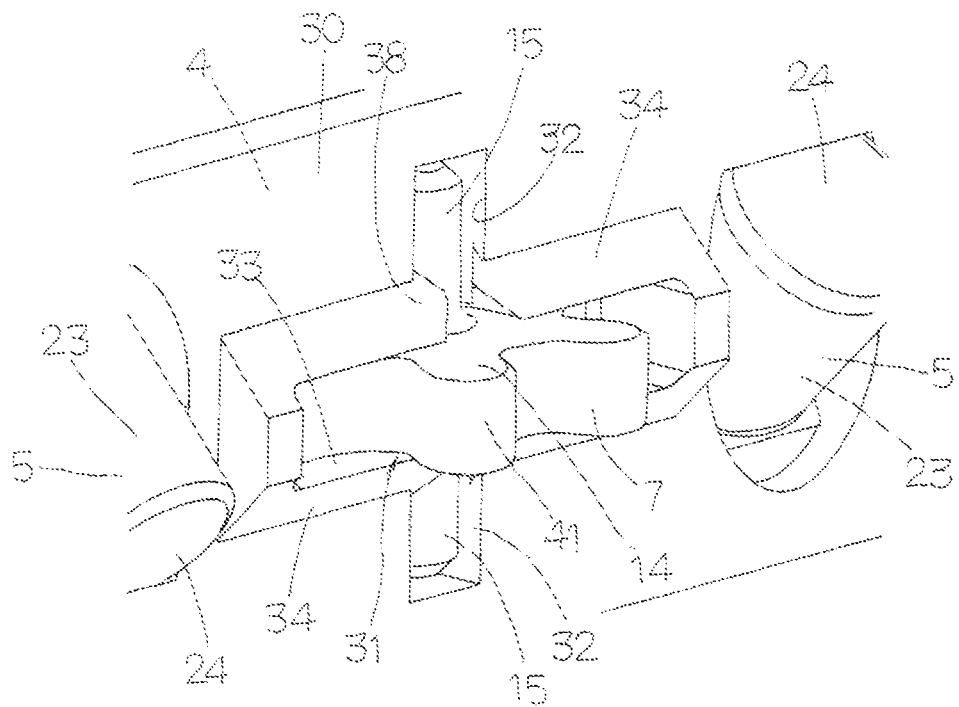
FIG. 22 is a perspective view showing the retainer plate and the pinion wheel in the retainer in discrepancy-prevention mechanism in the finite linear motion guide unit of FIG. 1.
Figure 23:
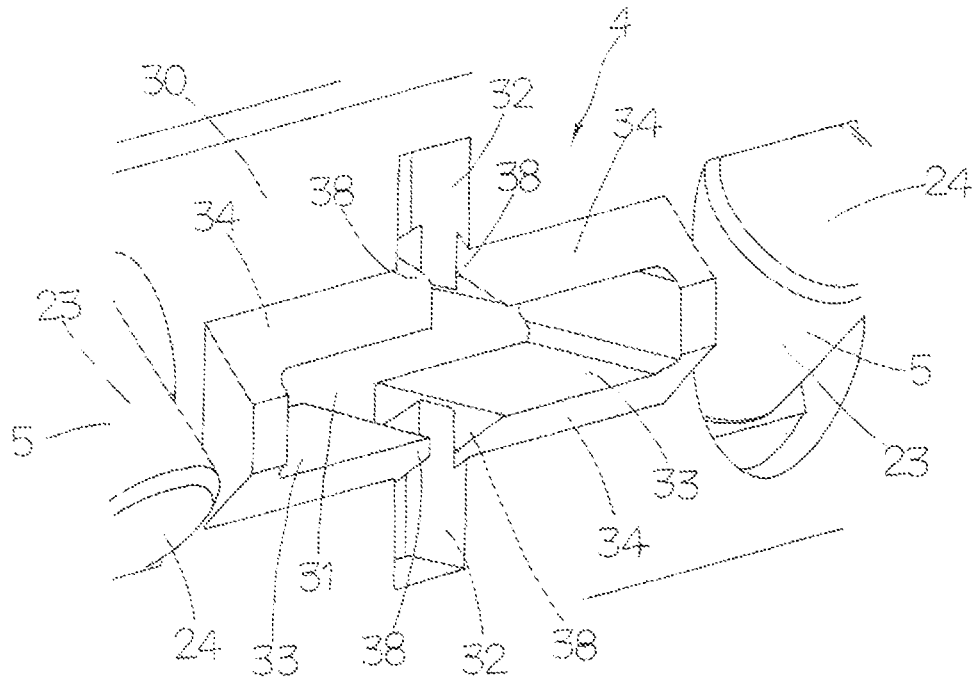
FIG. 23 is a perspective view of the retainer plate in the retainer, with the pinion wheel of the discrepancy-prevention mechanism of FIG. 22 being shown removed.

With linear motion guide unit of the present invention, the connecting bars 21 of the rack 8 as shown in FIG. 20 has end surfaces each made in different transverse inclined surface 36. The sidewise grooves 19 of the groove 16 for the rack 8 have end surfaces each made in different transverse inclined surface 26 in corresponding to the shape of the connecting bars 21. Moreover, the connecting bars 21 of the rack 8, as shown in FIG. 2, have ends of circular surface in transverse section and the valley 16 of the sidewise grooves has the end surface of circular surface 27 in cross-section in correspondence to the shape of the connecting bars 21. Alternately, the connecting bars 21 of the rack 8 as shown in FIG. 21 may be formed at one end thereof in an inclined or slant surface 36 in transverse section and at another end thereof in a circular surface 37 in transverse section. The sidewise grooves 19 of the groove 16 for the rack 8 are at one end thereof made in an inclined surface 26 in transverse section and at another end thereof made in a circular surface 27 in transverse section.

With linear motion guide unit of the present invention, the tooth 20 of the rack 8 at a tooth tip 28 thereof has a groove 35 of V-shape in transverse section to provide a relief for an angle 25 lying between the end surface 24 and the rolling surface 23 of the roller 5. The retainer plate 4 of synthetic resin molding has the flat surfaces 30 closely adjacent to the wall surfaces 29 of the paired raceway surfaces 11 and extending in parallel with each other. Further, the retainer plate 4 has more than one window 13 in which many rollers 5 are installed in a fashion their axes meet at right angles with the lengthwise direction and tilt 45 degrees with respect to the sides or flat surfaces 30 of the retainer plate 4 and also any two adjoining rollers 5 intersect with one another. The bearing hole 31 in the retainer plate 4 is made in a cross-shape consisting of vertical slot 32 extending in widthwise direction to accommodate therein a shaft 15 of the pinion 7 for rotation, and a horizontal slot 33 which extends lengthwise to accommodate therein the teeth 41 of the pinion 7. With the limited linear motion guide unit constructed as stated earlier, there are provided a holder 34 to guide rotation of the pinion 7 in such a manner extending from the flat surfaces 30 in a direction of rotation of the pinion wheel 7 on the widthwise both edges of the pinion slot 33. With the pinion 7, a circular disc 14 having the pinion teeth 41 is installed on the holder 34 made on the retainer plate 4 and therefore the pinion 7 makes rotation certainly without tilting because the holder 34 serves as guidance for the circular disc 14. Thus, the discrepancy-prevention mechanism makes the function thereof effective.

Figure 11:
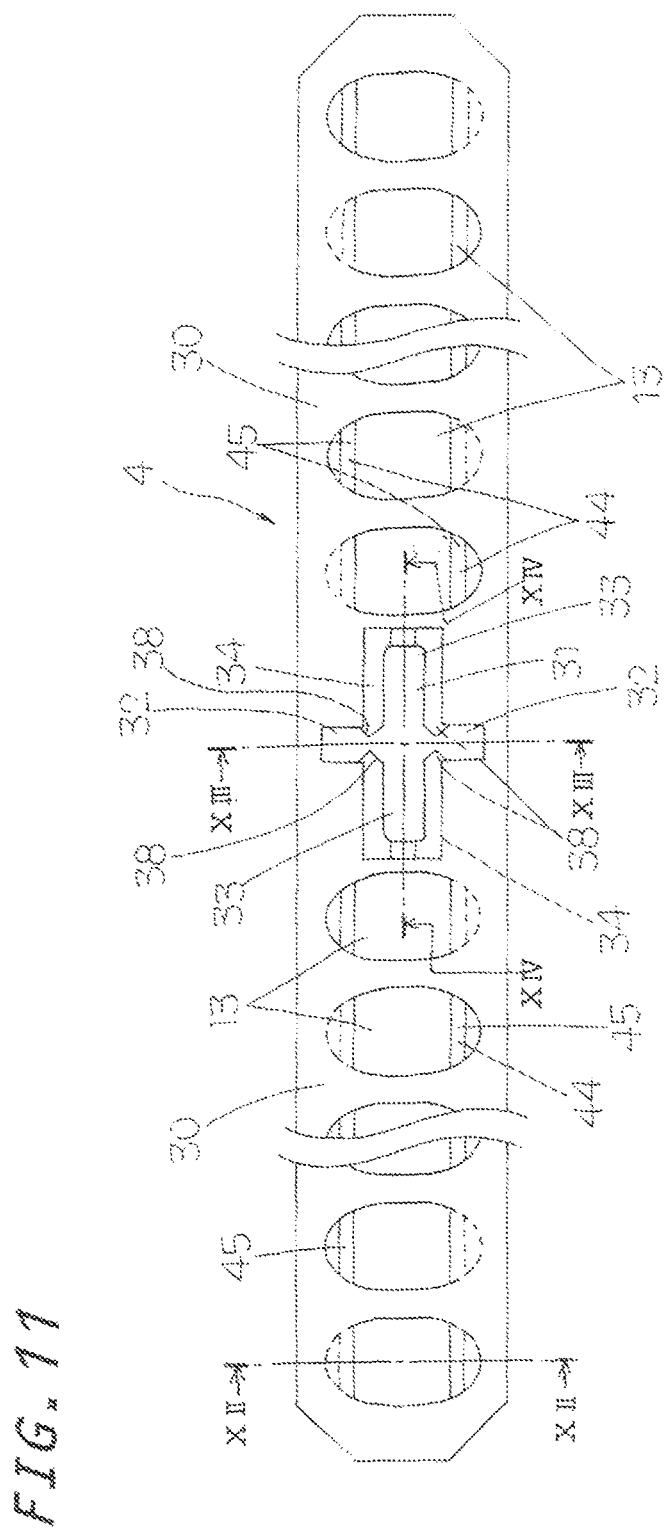
FIG. 11 is a front view of a retainer plate to be assembled in the finite linear motion guide unit of FIG. 1.
Figure 12:
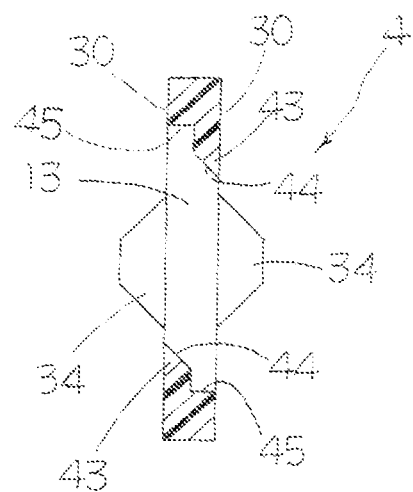
FIG. 12 is a sectional view of the retainer plate, taken along the plane lying on the line XII-XII of FIG. 11.
Figure 13:
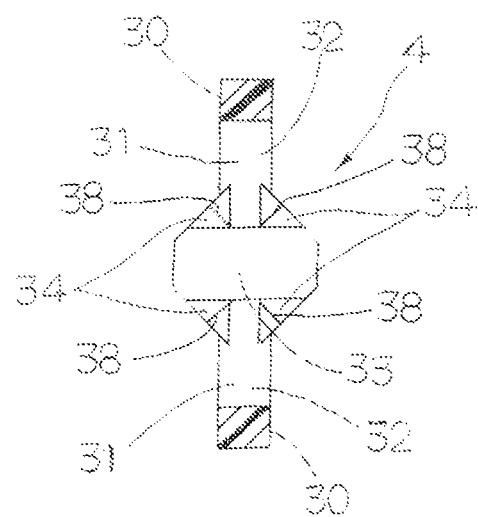
FIG. 13 is a sectional view of the retainer plate, taken along the plane lying on the line XIII-XIII of FIG. 11.
Figure 14:
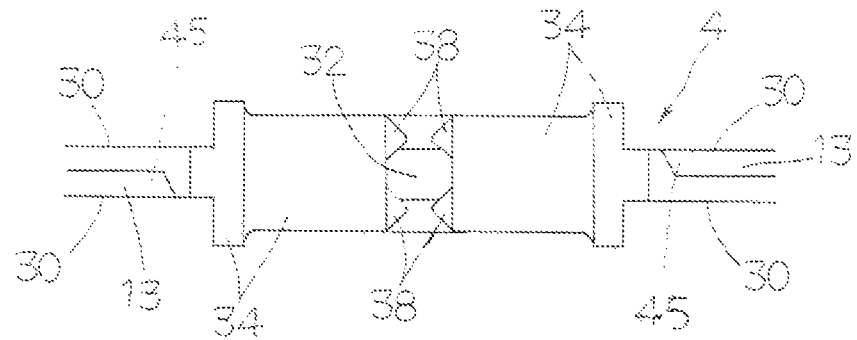
FIG. 14 is a sectional view of the retainer plate, taken along the plane lying on the line XIV-XIV of FIG. 11.
Figure 15:
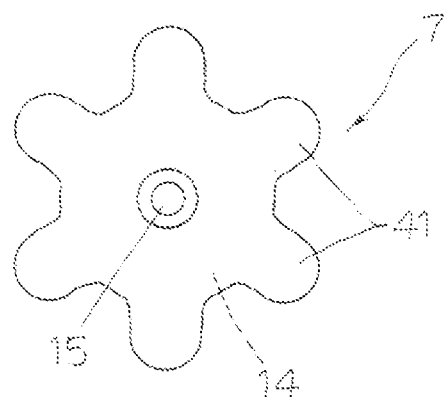
FIG. 15 is a plan view showing a pinion wheel in a discrepancy-prevention mechanism equipped in the finite linear motion guide unit of FIG. 1.
Figure 16:
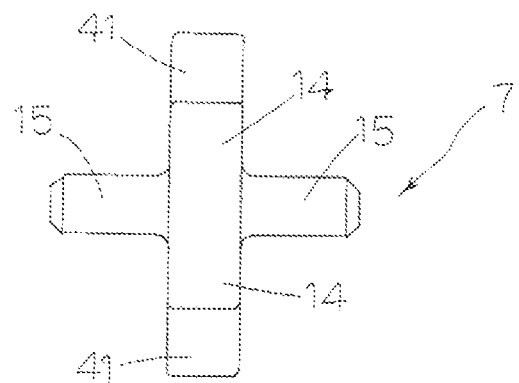
FIG. 16 is a view in elevation of the pinion wheel of FIG. 15.
Figure 17:
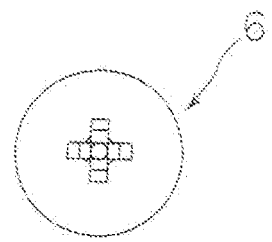
FIG. 17 is a front view showing an end screw to secure the rack in a mechanism to prevent any discrepancy equipped in the linear motion guide unit of FIG. 1.
Figure 18:
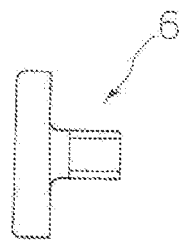
FIG. 18 is a side elevation of the end screw of FIG. 17.
Figure 19:
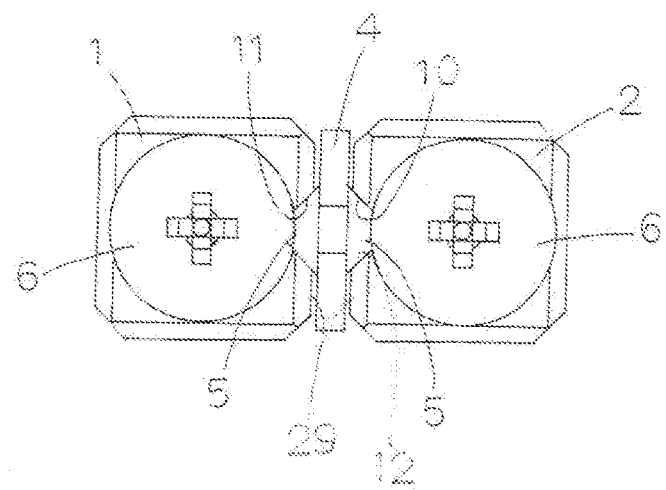
FIG. 19 is an end view showing the finite linear motion guide unit of FIG. 1.

Moreover, the holder 34 made on widthwise both ends of the pinion slot 33, as shown in FIG. 14, has raised portions 38 at both sides of the vertical slot 32 in a bearing hole 31. Four raised portions 38 surround the shaft 15 of the pinion 7 to secure them to the retainer plate 4. As shown in FIG. 11, moreover, when viewing the holder 34 lying face-on the flat surface 30 of the retainer plate 4, the raised portions 38 is formed in a small triangular shape extended at four locations inside the cross-shaped hole 31. Thus, when the pinion 7 is thrust into the bearing hole 31 in the retainer plate 4, the raised portions 38 are subject to elastic deformation and the pinion 7 is easily thrust onto the bearing hole 31 of the retainer plate 4. Moreover, four small raised portions 38 certainly retain the shaft 15 of the pinion 7 so that the discrepancy-prevention mechanism 9 may certainly prevent the discrepancy of the retainer 3.

The pinion 7, rack 8 and the retainer plate 4 are made of thermoplastic resin of crystalline polyacetal (POM).

With the limited linear motion guide unit constructed as stated earlier, the guideway members 1 and 2 in their cross-transverse have the dimensions, for example, of 4 mm in height and 3.9 mm in width. The fastening holes 39 made in the guideway members 1 and 2 each have the size of M 1.6. With the prior miniature limited linear motion guide unit, it has been impossible that the guideway members have the rack-and-pinion arrangement thereon, whereas the present invention provides the cross-shaped hole 31 constructed as stated earlier to assemble the pinion 7 into the retainer plate 4, thereby making it possible to install the discrepancy-prevention mechanism 9 for the rack-and-pinion mechanism.

What is claimed is:

1. A limited linear motion guide unit; comprising a pair of guideway members lying movable relatively to one another and having lengthwise V-shaped relief grooves in transverse section thereof, a retainer having a retainer plate arranged between guideway members to extend in a lengthwise direction of the guideway members, the retainer plate configured to retain more than one rolling element of roller at a preselected interval, and a discrepancy-prevention mechanism to keep the retainer against discrepancy which would cause between the guideway members, and the discrepancy-prevention mechanism consisting of racks mounted on the guideway members and a pinion supported for rotation in a hole made in the retainer plate, wherein the racks are composed of teeth mating with the pinion and a pair of connecting bars to fasten together opposite ends of the teeth to keep a predetermined interval between the connecting bars, and the connecting bars being made different each other in widthwise dimension to have an asymmetrical shape, wherein a valley made for the racks in the guideway members has bottom surface having a predetermined width to keep the racks therein, wherein the pinion has a middle groove opened at one end thereof to allow the pinion to mate with the teeth of the racks, and a pair of grooves extending sidewise from both side of the middle groove to provide the connecting bars, wherein the sidewise grooves extend lengthwise with asymmetry in widthwise distance to fit over the connecting bars of the asymmetric racks, and wherein the asymmetry of the connecting bars in the racks that the connecting bars are different from each other in height length, widthwise length, or shape in transverse section, and further the asymmetry of the sidewise grooves means that the sidewise grooves are formed complementarily in corresponding to the asymmetry of the connecting bar.

2. A limited linear motion guide unit constructed as defined in claim 1, wherein the connecting bars of the racks are formed at the end thereof in a different inclined or slant surface in transverse section, and the sidewise groove of the rack groove has a different inclined or slant surface of circular shape in cross-section in correspondence to a shape of the connecting bar.

3. A limited linear motion guide unit constructed as defined in claim 1, wherein the connecting bar of the racks have the end of circular surface in transverse section and the sidewise groove of the rack groove has an end surface of circular shape in cross-section in correspondence to a shape of the connecting bar.

4. A limited linear motion guide unit constructed as defined in claim 1, wherein the connecting bar of the racks are formed at one end thereof in an inclined or slant surface in transverse section and at another end thereof in a circular surface in transverse section, and the sidewise grooves of the groove for the racks are at one end thereof made in an inclined surface in transverse section in correspondence to a shape of the connecting bar and at another end thereof made in a circular surface in transverse section.

5. A limited linear motion guide unit constructed as defined in claim 1, wherein the teeth of the racks each have at their tooth tops V-shaped grooves to relieve corners between end surface and rolling surface of the roller.

6. A limited linear motion guide unit constructed as defined in claim 1, wherein the retainer plate has flat surfaces extending in parallel with each other and in adjacency with the wall surfaces of the guideway members and further the retainer plate is made of synthetic resin molding having more than one window in which the roller is held for rotation in such a geometry that an axial center of the roller is in perpendicular to the lengthwise direction of the guideway members and further tilted 45 degrees relative to the flat surface of the retainer plate, the retainer plate has the bearing hole made in a cross-shape consisting of a vertical slot extending in widthwise direction to accommodate therein a shaft of the pinion for rotation and a horizontal slot which extends lengthwise to accommodate therein teeth of the pinion, and wherein a holder to guide rotation of the pinion extends from the flat surfaces in a direction of rotation of the pinion on widthwise both edges of the pinion slot.

7. A limited linear motion guide unit constructed as defined in claim 6, wherein the holders formed at widthwise both edges of the pinion slot have raised portions at both sides of the vertical slot in a bearing hole, and the raised portions hold the pinion surrounding the shaft of the pinion wheel.

8. A limited linear motion guide unit constructed as defined in claim 7, wherein the raised portions formed on the holder are made to extend from inside shaft insertion at four corners lying at crossing part between the vertical slot in a bearing hole and the pinion slot to form a triangular shape.

9. A limited linear motion guide unit constructed as defined in claim 1, wherein the rack, pinion and the retainer plate are made of thermoplastic resin of crystalline polyacetal.

10. A limited linear motion guide unit constructed as defined in claim 1, wherein the pair of guideway members has a height of 4 mm and a width of 3.9 mm.

* * * * *